United States Patent
Lim et al.

(10) Patent No.: US 8,830,269 B2
(45) Date of Patent: Sep. 9, 2014

(54) METHOD AND APPARATUS FOR DEFORMING SHAPE OF THREE DIMENSIONAL HUMAN BODY MODEL

(75) Inventors: Seong Jae Lim, Daejeon (KR); Ho Won Kim, Daejeon (KR); Il Kyu Park, Daejeon (KR); Ji Young Park, Daejeon (KR); Ji Hyung Lee, Daejeon (KR); Jin Seo Kim, Daejeon (KR); Seung Wook Lee, Daejeon (KR); Chang Woo Chu, Daejeon (KR); Bon Woo Hwang, Daejeon (KR); Bon Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1126 days.

(21) Appl. No.: 12/495,063

(22) Filed: Jun. 30, 2009

(65) Prior Publication Data
US 2010/0156935 A1 Jun. 24, 2010

(30) Foreign Application Priority Data
Dec. 22, 2008 (KR) .................. 10-2008-0131768

(51) Int. Cl.
*G09G 5/00* (2006.01)
*G06T 13/40* (2011.01)
*G06T 19/20* (2011.01)
*G06T 17/30* (2006.01)

(52) U.S. Cl.
CPC .............. *G06T 17/30* (2013.01); *G06T 19/20* (2013.01); *G06T 2219/2021* (2013.01); *G06T 13/40* (2013.01)
USPC ........................................ 345/647; 345/473

(58) Field of Classification Search
CPC .......... G06T 13/40; G06T 17/30; G06T 19/20; G06T 2219/2021
USPC .................................................. 345/647, 473
See application file for complete search history.

(56) References Cited

U.S. PATENT DOCUMENTS

| 6,608,631 B1 | 8/2003 | Milliron |
| 7,307,633 B2 | 12/2007 | Anderson et al. |

(Continued)

FOREIGN PATENT DOCUMENTS

| JP | 2002-259474 | 9/2002 |
| JP | 2007-42111 | 2/2007 |
| KR | 10-2007-0004662 | 1/2007 |
| KR | 10-2008-0097089 | 11/2008 |

OTHER PUBLICATIONS

"Pose Space Deformation: A Unified Approach to Shape Interpolation and Skeleton-Driven Deformation", J. P. Lewis et al., SIGGRAPH, vol. 1, 2000.

(Continued)

*Primary Examiner* — Jeffery A Brier
(74) *Attorney, Agent, or Firm* — Staas & Halsey LLP

(57) ABSTRACT

A method of deforming a shape of a human body model includes the steps of reorganizing human body model data into a joint-skeleton structure-based Non-Uniform Rational B-spline (NURBS) surface model, generating statistical deformation information about control parameters of the NURBS surface model based on parameters of joints and key section curves for specific motions, and deforming the shape of the human body model based on the NURBS surface model and the statistical deformation information. The human body model data includes three-dimensional (3D) human body scan data and a 3D polygon mesh.

18 Claims, 5 Drawing Sheets

(56) References Cited

U.S. PATENT DOCUMENTS

2005/0169536 A1 8/2005 Accomazzi et al.
2007/0031003 A1 2/2007 Cremers
2008/0158224 A1* 7/2008 Wong et al. .................. 345/473

OTHER PUBLICATIONS

"Sweep-based human deformation", Dae-Eun Hyun et al., Springer-Verlag, The Visual Computer, vol. 21 pp. 542-550, 2005.

* cited by examiner

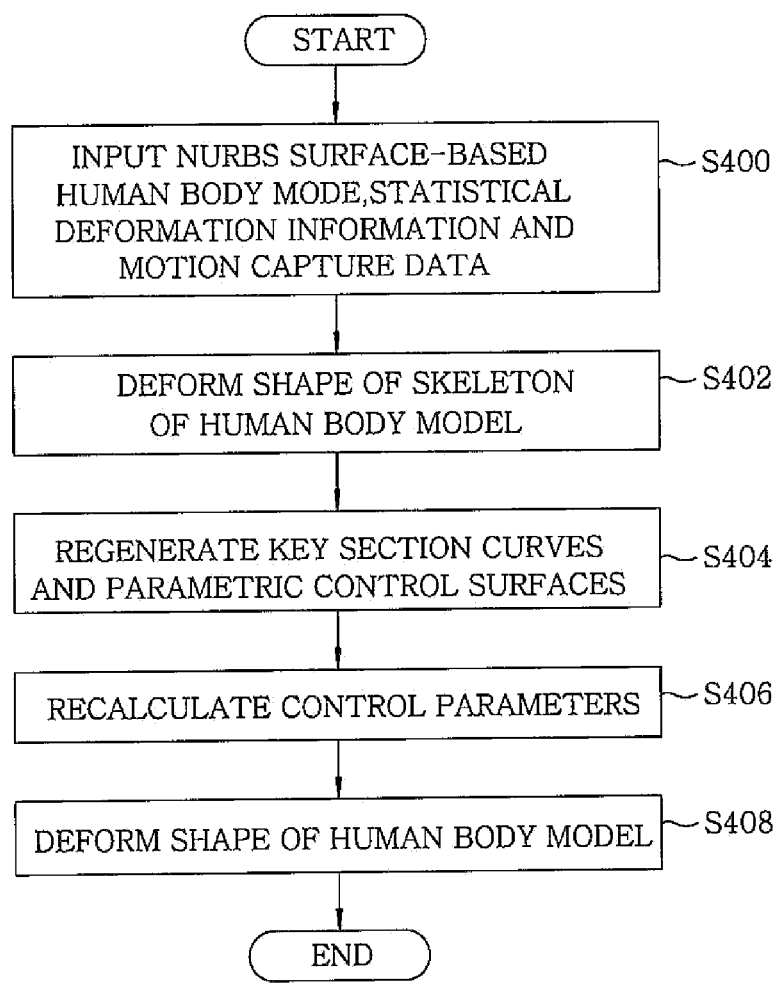

METHOD AND APPARATUS FOR DEFORMING SHAPE OF THREE DIMENSIONAL HUMAN BODY MODEL

CROSS-REFERENCE(S) TO RELATED APPLICATION(S)

The present invention claims priority of Korean Patent Application No. 10-2008-0131768, filed on Dec. 22, 2008, which is incorporated herein by reference.

FIELD OF THE INVENTION

The present invention relates to a technology for deforming shape of a three-dimensional human body model; and, more particularly, to a technology for automatically reproducing various natural motions of a performer through deformation of the shape of a Non-Uniform Rational B-spline (NURBS)-based human body model by using both a NURBS parametric control surface-based human body model, in which a joint-skeleton structure is used and key section curves between respective joints are approximated, and statistical deformation information about the control parameters of NURBS surfaces obtained from training data for a specific characteristic motion (pose).

BACKGROUND OF THE INVENTION

Human body shape models play important parts in three-dimensional (3D) games or the like, as well as computer animations. In order to implement the animations of such human body models, generation of a human body model enabling shape deformation must be performed in advance. The generation of the human body model plays an important role in determining the quality of the animations.

Human body models generated according to conventional technology include a stick model in which only an initial skeleton is modeled, a surface model in which the outward appearance of a human body is represented by surface patches, and a volume model in which the human body is configured using the combination of a sphere, a cylinder, an ellipsoid, etc.

However, such models are disadvantageous in that it is difficult to realistically represent the outward appearance of the human body or to naturally deform shapes corresponding to motions. Also, they require a lot of computation time for shape deformation or require a manual operation of a user such as a professional designer.

Recently, there have been proposed a muscle simulation model in which anatomical features are incorporated, and a linearly combined interactive skinning model based on example data composed of a skeleton and a mesh structure, etc. However, despite the advantage of enabling relatively realistic deformation of a shape, such models are problematic in that, it is difficult to perform deformation in real time and to produce the model due to limitation of computational speed, and in that the precision of generated animation is determined in accordance with the precision of previously produced models and a degree of the combination of the models, and artifacts such as the 'candy-wrapper' effect occur on principal joints.

SUMMARY OF THE INVENTION

It is, therefore, an object of the present invention to reorganize a given 3D polygon mesh-type model into a Non-Uniform Rational B-spline (NURBS) surface model having a joint-skeleton structure by forming a joint-skeleton structure, setting sections in principal regions in which the characteristics of a human body are incorporated between the respective joints of the skeleton, generating key section curves through the interpolation of skin vertexes located on each section at regular angles, forming NURBS surfaces enabling parametric control through the B-spline approximation of the locations and directions of the key section curves, and then binding the skin vertexes to the generated NURBS surfaces.

Another object of the present invention is to provide realistic deformation of the shape of the human body model in real time by utilizing statistical deformation information based on training data about the NURBS surfaces of the respective regions of the human body representing characteristics such as bending, stretching and protruding motions from among the motions of the human body.

In accordance with one aspect of the present invention, there is provided a method of deforming a shape of a human body model, comprising the steps of: reorganizing human body model data into a joint-skeleton structure-based Non-Uniform Rational B-spline (NURBS) surface model; generating statistical deformation information about control parameters of the NURBS surface model based on parameters of joints and key section curves for specific motions; and deforming the shape of the human body model based on the NURBS surface model and the statistical deformation information.

It is preferable that the human body model data includes three-dimensional (3D) human body scan data and a 3D polygon mesh.

It is preferable that the reorganizing step includes the steps of: generating a skeleton structure corresponding to landmarks set for respective regions of the human body model data; generating a hierarchical joint structure by using, in the generated skeleton structure, a spine of a trunk as a root and using articulating portions of respective regions of the human body model data as sub-roots; generating the key section curves based on the hierarchical joint structure; generating NURBS surfaces by interpolating the generated key section curves for the respective regions of the human body model data, thereby to generate an outward appearance of a NURBS surface model; and setting dependency between the NURBS surfaces and displacement of respective vertexes of the human body model data, thereby to output the NURBS surface model.

It is preferable that the hierarchical joint structure includes one or more joints.

It is preferable that the step of generating the key section curves includes the steps of: setting sections at joints generated for the respective regions of the human body model data, or between the respective joints; calculating a center point of a set of the vertexes which belong to a mesh-type human body model and exist on each of the sections; deriving a predetermined number of vertexes located at predetermined regular intervals from the center point, and setting the derived vertexes as key vertexes of the section; and interpolating the key vertexes through B-spline interpolation to generate the key section curves.

It is preferable that the step of generating the outward appearance of the NURBS surface model includes the steps of: generating a map corresponding to the key section curves; setting on the map a center position of a body region subjected to an external force and a deformation range from the center position in consideration of direction and strength of the external force when the external force is applied to the body region of the human body model data due to a specific motion; and incorporating the strength of the force in control points of the NURBS surfaces by controlling parameters of the map using the strength of the external force as a weight.

It is preferable that the map is a uv-map of section curves in a u-direction and section curves in a v-direction, the section curves being generated by performing B-spline interpolation using key vertexes as edit points.

It is preferable that the specific motion is at least one of a bending motion, a stretching motion, a protruding motion, and a collision.

It is preferable that the statistical deformation information generating step includes the steps of: setting specific motions of a human body at body articulating portions of the human body model data; acquiring rotation par a meters data and translation parameters data of the joints in the body articulating portions with respect to higher joints thereof for each of said specific motion of the human body through the reorganized NURBS surface model; acquiring the control parameters of the NURBS surfaces based on parameters of a map and parameters of locations and directions of the key section curves which are generated at the reorganizing step; and calculating statistical data based on the the control parameters of the NURBS surfaces to generate the statistical deformation information.

It is preferable that the specific motion of the human body includes one of a bending, a stretching and a protruding.

It is preferable that the step of acquiring the control parameters of the NURBS surfaces is repeatedly performed on body training data for the specific motions of the human body.

It is preferable that the body training data includes a predetermined number of pieces of the body training data collected in consideration of inherent characteristics of the human body.

It is preferable that the inherent characteristics of the human body include at least one of gender, muscular features, and a body shape.

It is preferable that the step of generating the statistical deformation information is performed by calculating, from the predetermined number of pieces of the body training data, variation in feature information of knot vectors and direction control points on the NURBS surfaces as statistical data.

It is preferable that the feature information of the direction control points and the knot vectors on the NURBS surfaces includes the parameters of the map, locations and directions of the respective key section curves and the locations and the directions of the joints of the body articulating portions with respect to the higher joints thereof.

It is preferable that the statistical deformation information generating step further includes the steps of: generating a mean value and a variance model of the feature information through Principal Component Analysis (PCA) of the generated statistical deformation information; and applying the variance model of the statistical deformation information to the NURBS surface model.

It is preferable that the deforming step includes the steps of: inputting the NURBS surface model, the statistical deformation information, and motion capture data captured for a specific to be animated; generating deformed joints by deforming the respective joints of the NURBS surface model with respect to locations and direction of the joints depending on the motion capture data; regenerating the key section curves and parametric control surfaces corresponding to the deformed joints; recalculating the control parameters based on the regenerated key section curves and the regenerated parametric control surfaces; and regenerating NURBS surfaces based on the recalculated control parameters to deform the human body model in compliance with the specific motion.

It is preferable that the statistical deformation information includes: a degree of variation in a shape from an average shape, of a feature information obtained from a training data; a center position of a region of the human body model data subjected to a force attributable to collisions; a deformation range, in which direction and strength of the force are considered, from the center position; and parameters of a map controlled using strength of the force as a weight.

It is preferable that the the step of recalculating the control parameters includes the steps of: incorporating bending characteristics of skin and stretching and protrusion characteristics of muscles, for the specific motion, with the NURBS surface model to be deformed, as weights thereof; and recalculating the control parameters of the NURBS surfaces from the input statistical deformation information depending on the joint parameters, in which parameters of locations and direction of the respective joints of the NURBS surface model to higher joints thereof are incorporated as weights, and parameters of locations, directions and the map of the key section curves.

It is preferable that the human body model data includes three-dimensional (3D) body scan data and a 3D polygon mesh.

In accordance with the present invention, the shape of a human body is automatically deformed on the basis of motion capture data, obtained by capturing the motions of a performer, using a NURBS parametric control surface-based human body model having a joint-skeleton structure. Therefore, the present invention is configured to use a statistical deformation information using training data about NURBS surface control parameter based on parameters of principal joints, indicating specific motion such as bending, stretching and protrusion from among the motions of the human body, and corresponding key section curves, to incorporate the center and range of a force, produced by external pressure or internal pressure attributable to collisions, in a uv-map, and to control the parameters of the uv-map, thus realistically and naturally providing the automatic deformation of the shape of a NURBS surface model in real time. Due thereto, the present invention is advantageous in that operation speed can be improved and costs can be minimized.

BRIEF DESCRIPTION OF THE DRAWINGS

The above and other objects and features of the present invention will become apparent from the following description of embodiments given in conjunction with the accompanying drawings, in which:

FIG. 7 is a flowchart showing a method of deforming the shape of a human body model in accordance with still another embodiment of the present invention, which shows a process performed by a human body model shape deformation unit.

DETAILED DESCRIPTION OF THE EMBODIMENTS

The present invention relates to a technology for deforming the shape of a human body model, which enables the shape of a human body to be automatically and naturally deformed based on motion capture data obtained by capturing the motions of a performer using a NURBS parametric control surface-based human body model having a joint-skeleton structure. Further, the present invention is configured to take a 3D polygon mesh-type human body model as input, generate a hierarchical joint structure having a skeleton structure and key section curves between respective joints, generate NURBS parametric control surfaces by approximating the key section curves, and set dependency between the NURBS surfaces and skin vertexes. Furthermore, the present invention is characterized in that various types of natural motions (operations) of a performer are automatically reproduced through the deformation of the shape of a human body model using both information about flexible (non-grid) deformation based on parametric control of the NURBS surfaces using parameters of uv-map corresponding to external/internal pressure by collisions, and statistical deformation information about control parameters of the NURBS surfaces obtained from training data for a specific characteristic motion (pose) of each joint region.

Embodiments

Hereinafter, embodiments of the present invention will be described in detail with reference to the accompanying drawings so that they can be readily implemented by those skilled in the art.

Figure 1:
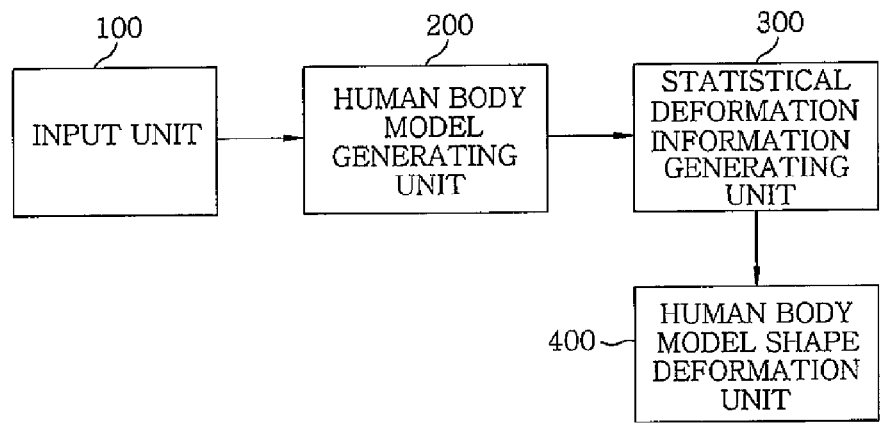
FIG. 1 is a block diagram showing an apparatus for deforming the shape of a human body model in accordance with an embodiment of the present invention.

FIG. 1 is a block diagram showing a construction of an apparatus and method for deforming the shape of a human body model in accordance with an embodiment of the present invention. The apparatus includes an input unit 100, a human body model generating unit 200, a statistical deformation information generating unit 300, and a human body model shape deformation unit 400.

As shown in FIG. 1, the input unit 100 is a means capable of taking human body model data including 3D human body scan data and a 3D polygon mesh in accordance with the present embodiment, as input.

The human body model generating unit 200 is configured to reorganize the human body model data which is input through the input unit 100, into a joint-skeleton structure-based NURBS surface model.

The statistical deformation information generating unit 300 generates statistical deformation information about the control parameters of the NURBS surface model based on the parameters of joints and key section curves for various specific motions.

The human body model shape deformation unit 400 deforms the shape of a human body model on the basis of both the NURBS surface model, reorganized by the human body model generating unit 200 and the statistical deformation information generated by the statistical deformation information generating unit 300.

A method of deforming the shape of the human body model using the apparatus having the above construction in accordance with the present embodiment will be described below.

First, when human body model data including 3D human body scan data and a 3D polygon mesh is input through the input unit 100, the human body model generating unit 200 reorganizes the human body model data into a joint-skeleton structure-based NURBS surface model.

Thereafter, statistical deformation information about the control parameters of the NURBS surface model based on the parameters of the joints and the key section curves are generated for the various specific motions by the statistical deformation information generating unit 300.

The NURBS surface model and the statistical deformation information are provided to the human body model shape deformation unit 400. The human body model shape deformation unit 400 deforms the shape of the human body model on the basis of the NURBS surface model and the statistical deformation information.

Figure 2:
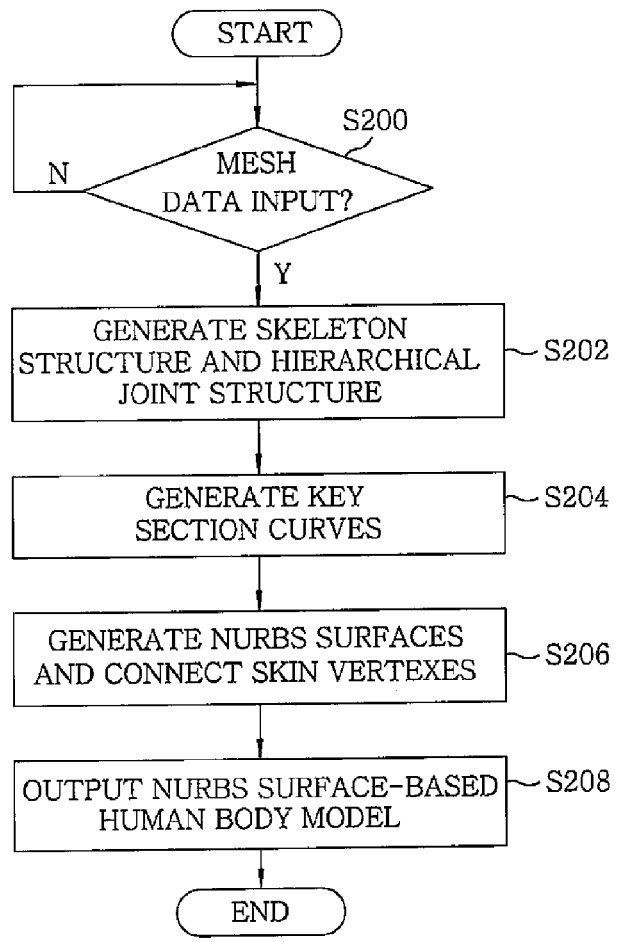
FIG. 2 is a flowchart representing a method of deforming the shape of a human body model in accordance with another embodiment of the present invention, which represents a process performed by a human body model generating unit.

Meanwhile, FIG. 2 is a flowchart showing a process performed by the human body model generating unit 200 of FIG. 1, that is, a method of generating the NURBS surface model.

Figure 3:
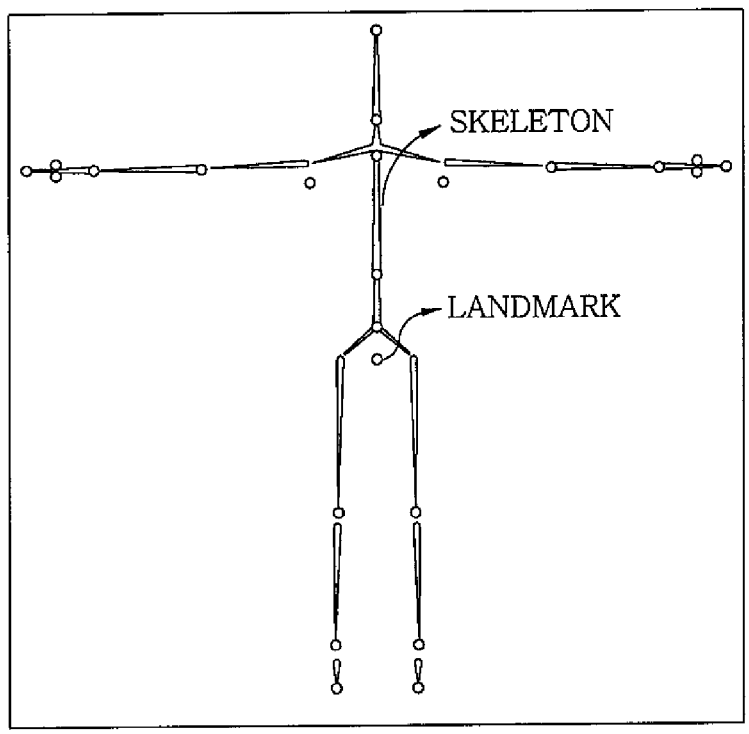
FIG. 3 is a diagram illustrating a joint-skeleton human body model applied to the embodiment of the present invention.

As shown in FIG. 2, when a mesh-type human body model is input through the input unit 100 at step S200, a skeleton structure is generated using landmarks set by a user for respective body regions. And then, a hierarchical joint structure having a total of n (for example, 55) joints is generated in such a way as to use a spine of a trunk of a human body as a root in the generated skeleton structure, and to use principal articulating portions of respective the body regions (for example, a shoulder region, a wrist region, a pelvic region and an ankle region) as sub-roots at step S202. FIG. 3 illustrates a joint-skeleton body model in accordance with the present embodiment, where landmarks and skeletons, set by the user to generate an initial skeleton structure are shown.

In this case, the landmarks of respective body regions are located as listed in the following Table 1.

TABLE 1

| Type | Locations and number of landmarks in body regions |
|---|---|
| Arm | One landmark for each of shoulder, elbow and wrist, 14 landmarks for respective finger knuckles (three portions), one landmark for fingertip: total of 18 landmarks |
| Leg | One landmark for each of hip, knee and ankle, five landmarks for respective knuckles of respective toes, one landmark for tiptoe: total of nine landmarks |
| Trunk | One landmark for each of center of collarbone, spine, and pelvis: total of three landmarks |
| Head | One landmark for each of neck, center of face, and crown of head: total of three landmarks |

Next, sections are set at locations corresponding to joints generated for respective body regions or between respective joints at which the outward appearance of the corresponding body region therebetween can be represented well in consideration of the muscular features. Further, a center point of a set of vertexes which belong to the mesh-type human body model and exist on each of the sections is calculated. And then, vertexes located at predetermined interval (for example, at an angle of 10°) from the center point are derived and set as key vertexes of the section. Further, the respective key vertexes are interpolated through B-spline interpolation, and thus the key section curves of FIG. 4 are generated at step S204.

Figure 4:
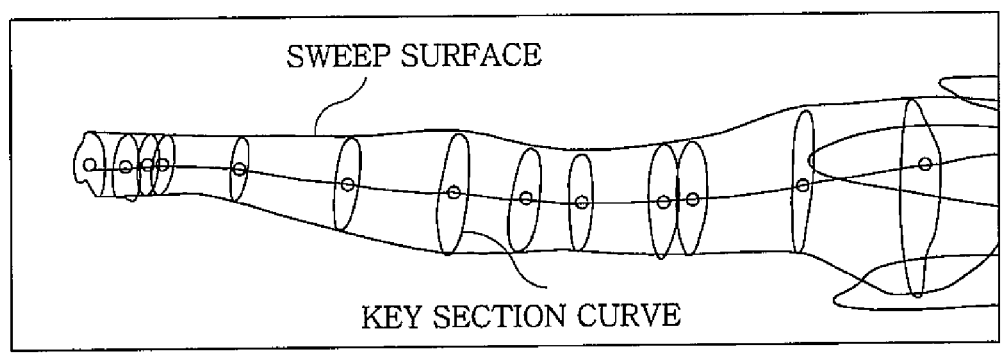
FIG. 4 is a diagram partially describing key section curves applied to the embodiment of the present invention, and a NURBS surface generated by interpolating the key section curves.

Thereafter, at step S206, the generated key section curves are interpolated for the respective body regions, so that NURBS surfaces are generated, and thus outward appearance of the NURBS surface model is generated, as shown in FIG. 4.

Figure 5:
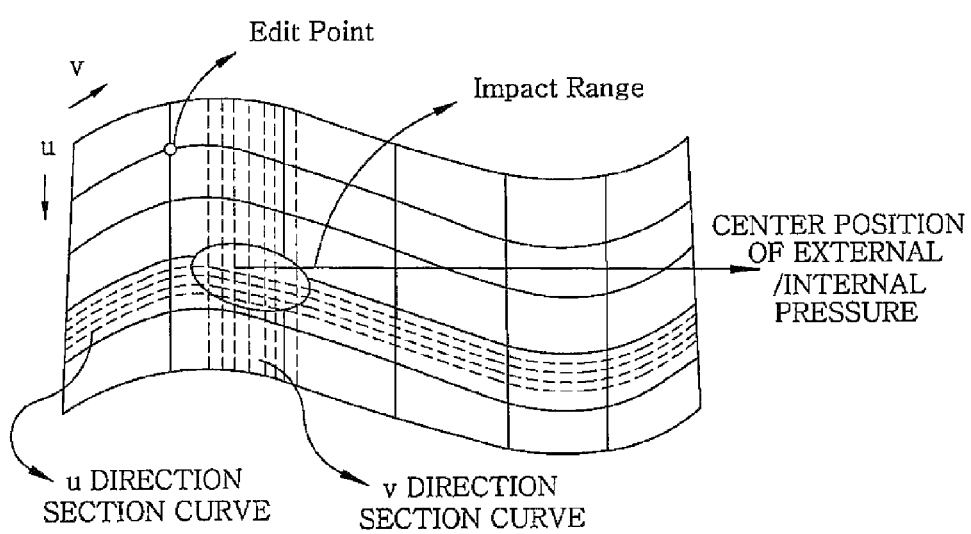
FIG. 5 is a development diagram showing the surface of FIG. 4.

In this case, as shown in FIG. 5, each of the NURBS surfaces may be generated in such a way as following. First, a uv-map comprising section curves in a u-direction and a v-direction is generated by interpolating key vertexes corresponding to respective key section curves as edit points through B-spline interpolation. Further, a center position (C ($u_i,v_i$)) of a specific body region, subjected to an arbitrary external/internal force due to a specific motion such as bending, stretching or protrusion, or due to collisions, is set on the uv-map. Thereafter, a deformation range (that is, a decremental impact range) from the center position is set in consideration of direction and strength of the force motion. And then, the parameters of the uv-map are controlled by using the strength of the external force as a weight, and are incorporated in control points in u and v directions of the NURBS surfaces.

Finally, the dependency between the generated NURBS surfaces and the displacement of the respective vertexes of the input mesh-type human body model is set at step S206, and thus the NURBS surface model is outputted at step S208.

Figure 6:
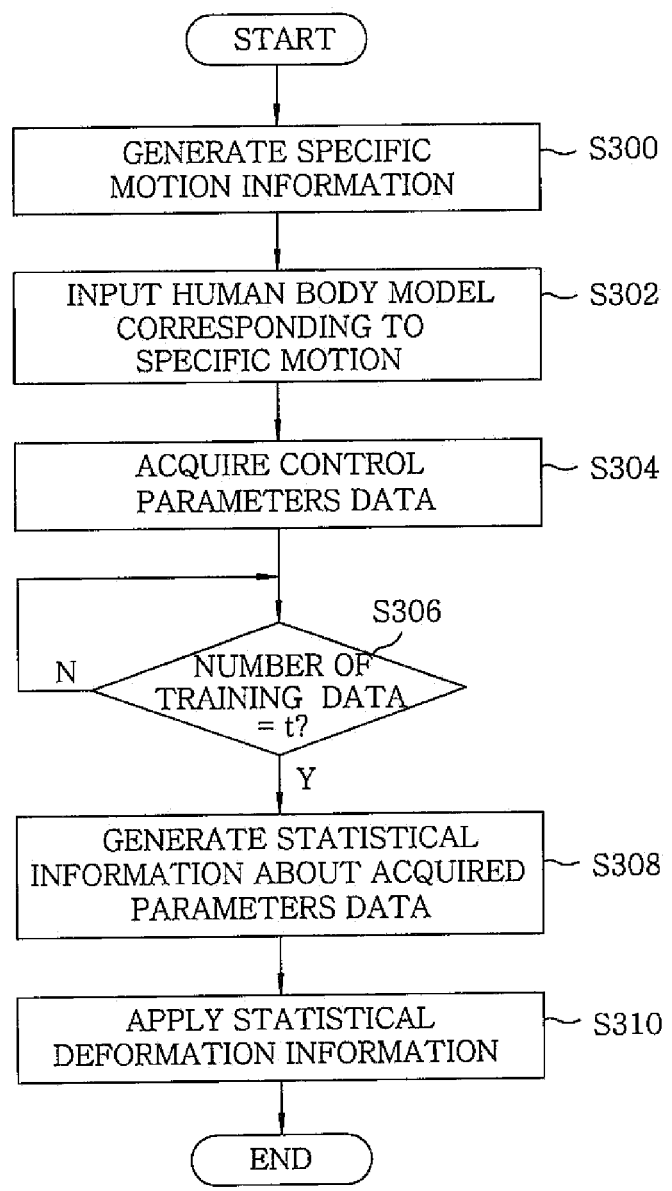
FIG. 6 is a flowchart illustrating a method of deforming the shape of a human body model in accordance with a further embodiment of the present invention, which illustrates a process performed by a statistical deformation information generating unit.

FIG. 6 is a flowchart illustrating a process performed by the statistical deformation information generating unit 300 of FIG. 1.

As illustrated in FIG. 6, various specific motions of a human body, causing phenomena such as bending, stretching and protrusion at principal articulating portions such as the shoulder, elbow, hand, neck, knee and ankle, are set at step S300.

At step S302, the NURBS surface model generated at step S208 in FIG. 2 and representing a specific motion in consideration of the specific motions which are set at step S300, is input.

At step S304, through the NURBS surface model which is input at step S302, the control parameters of the NURBS surfaces are acquired based on rotation parameters data and translation parameters data of joints in the principal articulating portions with respect to the higher joints thereof for each specific motion, and parameters data of uv-map, locations and directions of the key section curves.

In this case, the step S304 of acquiring the parameters data may be repeatedly performed on various t pieces of body training data collected for the specific motions, in consideration of the inherent characteristics of the human body such as the gender, muscular features and a body shape, at step S306.

Accordingly, the statistical deformation information generating unit 300 calculates, from the t pieces of training data, variation in feature information of knot vectors and control points in u and v direction on the NURBS surfaces including the parameters of uv-map, the locations and directions of the key section curves and the parameters of locations and directions of joints of the principal articulating portions to the higher joints thereof, as the statistical data, thus generates the statistical deformation information at step S308.

At step S310, the mean value of the feature information and a variance model of the respective feature information are generated through the Principal Component Analysis (PCA) of the statistical deformation information about the feature information. The variance model of the statistical deformation information is used in a process for automatically and naturally deforming the NURBS surface model desired to be deformed.

FIG. 7 is a flowchart showing a process performed by the human body model shape deformation unit 400 of FIG. 1.

As shown in FIG. 7, when the NURBS surface model generated by the human body model generating unit 200, statistical deformation information generated by the statistical deformation information generating unit 300, and motion capture data captured for a specific motion for which the human body model is desired to be animated are input to the human body model shape deformation unit 400 at step S400, the human body model shape deformation unit 400 proceeds to step S402.

At step S402, the human body model shape deformation unit 400 deforms the respective joints of the NURBS surface model, input at step S400, with respect to locations and direction of the joints depending on the input motion capture data.

Further, at step S404, the human body model shape deformation unit 400 regenerates both the respective key section curves and respective parametric control surfaces depending on the respective joints deformed at step S402.

Further, the human body model shape deformation unit 400 recalculates the control parameters of the NURBS surfaces from the statistical deformation information on the basis of: outward appearance parameters in which the inherent characteristics of the human body, such as the gender, muscular features and a body shape are incorporated as weights, in deforming the feature of the NURBS surface model, such as the bending of the skin and the stretching and protrusion of muscles, for a specific motion desired to be deformed; joint parameters in which the location parameters and the translation parameters of joints of the principal articulating portions with respect to the higher joints thereof are incorporated as weights; and the parameters of the locations, directions and the uv-map of the key section curves at step S406.

Here, the statistical deformation information reflects a degree of variation in a average shape of the feature information, obtained from the respective pieces of training data, and enables a center position of a region subjected to a force due to external/internal pressure attributable to collisions and a deformation range from the center position in consideration of the direction and strength of the force to be set on the uv-map, and enables the parameters of the uv-map to be controlled using the strength of the force as weights. Accordingly, the control parameters of the NURBS surfaces such as control points and knot vectors of the NURBS surfaces are recalculated.

Finally, the human body model shape deformation unit 400 regenerates NURBS surfaces on the basis of the control parameters recalculated at step S406, deforms the shape of the human body model in compliance with a specific motion, and repeats the above process for all frames, thus performing the animation of the human body model at step S408.

As described above, the present embodiment is configured to reorganize a given 3D polygon mesh-type model into a NURBS surface model having a joint-skeleton structure by forming the joint-skeleton structure, setting sections in principal regions in which the characteristics of a human body are incorporated between the respective joints of a skeleton, generating key section curves through the interpolation of skin vertexes located on each section at regular angles, forming the shape of NURBS surfaces enabling parametric control through the B-spline approximation of the locations and directions of the key section curves, and then binding the skin vertexes to the generated NURBS surfaces.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprising", "comprise" and conjugations thereof does not exclude the presence of components or steps other than those stated in all claims or specification. The article "a" or "an" preceding a component does not exclude the presence of a plurality of such components. The present invention may be implemented by means of hardware including several distinct components and by means of a suitably programmed computer. In the claim enumerating several means, several of these means may be embodied by one and the same item of hardware. The mere fact that certain measures are recited in mutually different dependent claims does not indicate that a combination of these measures cannot be used.

While the invention has been shown and described with respect to the embodiments, it will be understood by those skilled in the art that various changes and modifications may be made without departing from the scope of the invention as defined in the following claims.

What is claimed is:

1. A method of deforming a shape of a human body model, comprising the steps of:
   reorganizing human body model data into a joint-skeleton structure-based Non-Uniform Rational B-spline (NURBS) surface model;
   generating statistical deformation information about control parameters of the NURBS surface model based on parameters of joints and key section curves for specific motions; and
   deforming the shape of the human body model based on the NURBS surface model and the statistical deformation information,
   wherein the reorganizing step includes the steps of:
   generating a skeleton structure corresponding to landmarks set for respective regions of the human body model data;
   generating a hierarchical joint structure by using, in the generated skeleton structure, a spine of a trunk as a root and using articulating portions of respective regions of the human body model data as sub-roots;
   generating the key section curves based on the hierarchical joint structure;
   generating NURBS surfaces by interpolating the generated key section curves for the respective regions of the human body model data, thereby to generate an outward appearance of a NURBS surface model; and
   setting dependency between the NURBS surfaces and displacement of respective vertexes of the human body model data, thereby to output the NURBS surface model, and
   wherein the method is performed by means of computer hardware comprising
   a human body model generating unit configured to perform said reorganizing;
   a statistical deformation generating unit configured to perform said generating; and
   a human body model shape deformation unit configured to perform said deforming.

2. The method of claim 1, wherein the human body model data includes three-dimensional (3D) human body scan data and a 3D polygon mesh.

3. The method of claim 1, wherein the hierarchical joint structure includes one or more joints.

4. The method of claim 1, wherein the step of generating the key section curves includes the steps of:
   setting sections at joints generated for the respective regions of the human body model data, or between the respective joints;
   calculating a center point of a set of the vertexes which belong to a mesh-type human body model and exist on each of the sections;
   deriving a predetermined number of vertexes located at predetermined regular intervals from the center point, and setting the derived vertexes as key vertexes of the section; and
   interpolating the key vertexes through B-spline interpolation to generate the key section curves.

5. The method of claim 1, wherein the step of generating the outward appearance of the NURBS surface model includes the steps of:
   generating a map corresponding to the key section curves;
   setting on the map a center position of a body region subjected to an external force and a deformation range from the center position in consideration of direction and strength of the external force when the external force is applied to the body region of the human body model data due to a specific motion; and
   incorporating the strength of the force in control points of the NURBS surfaces by controlling parameters of the map using the strength of the external force as a weight.

6. The method of claim 5, wherein the map is a uv-map of section curves in a u-direction and section curves in a v-direction, the section curves being generated by performing B-spline interpolation using key vertexes as edit points.

7. The method of claim 5, wherein the specific motion is at least one of a bending motion, a stretching motion, a protruding motion, and a collision.

8. A method of deforming a shape of a human body model, comprising the steps of:
   reorganizing human body model data into a joint-skeleton structure-based Non-Uniform Rational B-spline (NURBS) surface model;
   generating statistical deformation information about control parameters of the NURBS surface model based on parameters of joints and key section curves for specific motions; and
   deforming the shape of the human body model based on the NURBS surface model and the statistical deformation information,
   wherein the statistical deformation information generating step includes the steps of:
   setting specific motions of a human body at body articulating portions of the human body model data;
   acquiring rotation parameters data and translation parameters data of the joints in the body articulating portions with respect to higher joints thereof for each of said specific motion of the human body through the reorganized NURBS surface model;
   acquiring the control parameters of the NURBS surfaces based on parameters of a map and parameters of locations and directions of the key section curves which are generated at the reorganizing step; and
   calculating statistical data based on the control parameters of the NURBS surfaces to generate the statistical deformation information, and
   wherein the method is performed by means of computer hardware comprising
   a human body model generating unit configured to perform said reorganizing;
   a statistical deformation generating unit configured to perform said generating; and
   a human body model shape deformation unit configured to perform said deforming.

9. The method of claim 8, wherein the specific motion of the human body includes one of a bending, a stretching and a protruding.

10. The method of claim 8, wherein the step of acquiring the control parameters of the NURBS surfaces is repeatedly performed on body training data for the specific motions of the human body.

11. The method of claim 10, wherein the body training data includes a predetermined number of pieces of the body training data collected in consideration of inherent characteristics of the human body.

12. The method of claim 11, wherein the inherent characteristics of the human body include at least one of gender, muscular features, and a body shape.

13. The method of claim 11, wherein the step of generating the statistical deformation information is performed by calculating, from the predetermined number of pieces of the body training data, variation in feature information of knot vectors and direction control points on the NURBS surfaces as statistical data.

14. The method of claim 13, wherein the feature information of the direction control points and the knot vectors on the NURBS surfaces includes the parameters of the map, locations and directions of the respective key section curves and the rotation parameters and the translation parameters of the joints of the body articulating portions with respect to the higher joints thereof.

15. The method of claim 8, wherein the statistical deformation information generating step further includes the steps of:
  generating a mean value and a variance model of the feature information through Principal Component Analysis (PCA) of the generated statistical deformation information; and
  applying the variance model of the statistical deformation information to the NURBS surface model.

16. A method of deforming a shape of a human body model, comprising the steps of:
  reorganizing human body model data into a joint-skeleton structure-based Non-Uniform Rational B-spline (NURBS) surface model;
  generating statistical deformation information about control parameters of the NURBS surface model based on parameters of joints and key section curves for specific motions; and
  deforming the shape of the human body model based on the NURBS surface model and the statistical deformation information,
  wherein the deforming step includes the steps of:
  inputting the NURBS surface model, the statistical deformation information, and motion capture data captured for a specific motion to be animated;
  generating deformed joints by deforming the respective joints of the NURBS surface model with respect to locations and direction of the joints depending on the motion capture data;
  regenerating the key section curves and parametric control surfaces corresponding to the deformed joints;
  recalculating the control parameters based on the regenerated key section curves and the regenerated parametric control surfaces; and
  regenerating NURBS surfaces based on the recalculated control parameters to deform the human body model in compliance with the specific motion, and
  wherein the method is performed by means of computer hardware comprising
  a human body model generating unit configured to perform said reorganizing;
  a statistical deformation generating unit configured to perform said generating; and
  a human body model shape deformation unit configured to perform said deforming.

17. The method of claim 16, wherein the statistical deformation information includes:
  a degree of variation in a shape from an average shape, of a feature information obtained from a training data;
  a center position of a region of the human body model data subjected to a force attributable to collisions;
  a deformation range, in which direction and strength of the force are considered, from the center position; and
  parameters of a map controlled using strength of the force as a weight.

18. The method of claim 16, wherein the step of recalculating the control parameters includes the steps of:
  incorporating bending characteristics of skin and stretching and protrusion characteristics of muscles, for the specific motion, with the NURBS surface model to be deformed, as weights thereof; and
  recalculating the control parameters of the NURBS surfaces from the input statistical deformation information depending on the joint parameters, in which rotation parameters and translation parameters of the respective joints of the NURBS surface model to higher joints thereof are incorporated as weights, and parameters of locations, directions and the map of the key section curves.

* * * * *